United States Patent
Takahashi et al.

(10) Patent No.: US 8,837,495 B2
(45) Date of Patent: Sep. 16, 2014

(54) MOBILE COMMUNICATION SYSTEM, RELAY NODE, RADIO BASE STATION, AND GATEWAY DEVICE

(75) Inventors: Hideaki Takahashi, Yokohama (JP); Wuri Andarmawanti Hapsari, Yokosuka (JP); Anil Umesh, Yokohama (JP); Mikio Iwamura, Tokyo (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 89 days.

(21) Appl. No.: 13/376,778

(22) PCT Filed: Jun. 8, 2010

(86) PCT No.: PCT/JP2010/059690
§ 371 (c)(1),
(2), (4) Date: Feb. 15, 2012

(87) PCT Pub. No.: WO2010/143626
PCT Pub. Date: Dec. 16, 2010

(65) Prior Publication Data
US 2012/0140666 A1    Jun. 7, 2012

(30) Foreign Application Priority Data
Jun. 8, 2009   (JP) .............................. P2009-137756

(51) Int. Cl.
*H04L 12/28* (2006.01)
*H04W 76/02* (2009.01)
*H04W 28/24* (2009.01)
*H04W 84/04* (2009.01)

(52) U.S. Cl.
CPC ............ *H04W 76/025* (2013.01); *H04W 28/24* (2013.01); *H04W 76/022* (2013.01); *H04W 84/047* (2013.01)

USPC ...... 370/395.54; 370/252; 370/235; 370/312; 370/315

(58) Field of Classification Search
CPC ....... H04W 12/04; H04W 12/06; H04W 4/00; H04L 12/26
USPC ..................... 370/235, 312, 315, 252, 395.54
See application file for complete search history.

(56) References Cited

U.S. PATENT DOCUMENTS 7,869,461 B2 * 1/2011 Lohr et al. .................... 370/469
8,270,361 B2 * 9/2012 Yi et al. ........................ 370/329

(Continued)

FOREIGN PATENT DOCUMENTS

WO     2007/128710 A1    11/2007
WO     2008/156275 A2    12/2008

OTHER PUBLICATIONS

Office Action for Japanese Patent Application No. 2009-137756 mailed Aug. 24, 2010, with English translation thereof (4 pages).

(Continued)

*Primary Examiner* — Chandrahas Patel
*Assistant Examiner* — Lan Truong
(74) *Attorney, Agent, or Firm* — Osha Liang LLP

(57) ABSTRACT

A mobile communication system according to the present invention comprising a plurality of Un radio bearers set between the plurality of mobile stations UE and the relay node RN, each of Un radio bearers for a predetermined QoS set for different mobile stations UE is configured to be mapped to a Un radio bearer for the predetermined QoS set between the relay node RN and the radio base station DeNB.

6 Claims, 10 Drawing Sheets

(56) References Cited

U.S. PATENT DOCUMENTS

2009/0252049 A1* 10/2009 Ludwig et al. ............... 370/252
2010/0260098 A1* 10/2010 Ulupinar et al. ............. 370/315
2012/0039471 A1* 2/2012 Kim et al. .................... 380/270

OTHER PUBLICATIONS

LG Electronics Inc., "Bearer Mapping in Relay Node," 3GPP TSG-RAN2 Meeting #66, R2-092845, May 4-8, 2009, 4 pages.

NTT DOCOMO, Inc., "On S1 termination and Protocol Stack in Relay Architecture," 3GPP TSG-RAN2 #66, R2-093283, May 4-8, 2009, 8 pages.

3GPP TS 36.300 V8.8.0, Mar. 2009, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 157 pages.

3GPP TR 36.814 V0.4.1, Feb. 2009, "3rd Generation Partnership Project; Technical Specification Group Radio Access Network; Further Advancements for E-UTRA Physical Layer Aspects (Release 9)," 31 pages.

International Search Report issued in PCT/JP2010/059690, mailed on Aug. 24, 2010, with translation, 4 page.

* cited by examiner

MOBILE COMMUNICATION SYSTEM, RELAY NODE, RADIO BASE STATION, AND GATEWAY DEVICE

TECHNICAL FIELD

The present invention relates to a mobile communication system, a relay node, a radio base station, and a gateway device.

BACKGROUND ART

In a mobile communication system employing an LTE-Advanced scheme which is a next-generation communication scheme of an LTE scheme, a "relay node RN" having the same function as that of a radio base station DeNB can be connected between a mobile station UE and the radio base station DeNB.

As illustrated in FIG. 1, the LTE-Advanced mobile communication system is configured such that an E-RAB (E-UTRAN Radio Access Bearer, a bearer for a mobile station UE) is set between the mobile station UE and a gateway device S-GW (Serving-Gateway) as a bearer for a U plane, a Uu radio bearer (a first radio bearer) is set between the mobile station UE and a relay node RN, a Un radio bearer (a second radio bearer) is set between the relay node RN and the radio base station DeNB, and an S1 bearer is set between the radio base station DeNB and the gateway device S-GW.

However, there is a problem that at the current moment, in the LTE-Advanced mobile communication system, a method for mapping the E-RAB, the Uu radio bearer, the Un radio bearer, and the S1 bearer has not been defined.

SUMMARY OF THE INVENTION

Therefore, the present invention has been achieved in view of the above-described problems, and an object thereof is to provide a mobile communication system capable of appropriately mapping an E-RAB, a Uu radio bearer, a Un radio bearer, and an S1 bearer, a relay node, a radio base station, and a gateway device.

A gist of a first characteristic of the present invention is a mobile communication system comprising a plurality of mobile stations, a relay node, and a radio base station, in which from among a plurality of first radio bearers set between the plurality of mobile stations and the relay node, each of first radio bearers for a predetermined QoS set for different mobile stations is configured to be mapped to a second radio bearer for the predetermined QoS set between the relay node and the radio base station.

A gist of a second characteristic of the present invention is a relay node, comprising a mapping processing unit configured to map each of first radio bearers for a predetermined QoS, which are set for different mobile stations from among a plurality of first radio bearers set between a plurality of mobile stations and the relay node, to a second radio bearer for the predetermined QoS set between the relay node and the radio base station and a priority control processing unit configured to perform a priority control process for a multiplexing process to the second radio bearer for the predetermined QoS of uplink user data, which has been received via each of the first radio bearers for the predetermined QoS, based on a priority assigned to each of the first radio bearers for the predetermined QoS.

A gist of a third characteristic of the present invention is a radio base station, comprising a mapping processing unit configured to map each of bearers for a predetermined QoS, which are set for different mobile stations from among a plurality of bearers set between the radio base station and a gateway device, to a radio bearer for the predetermined QoS set between a relay node and the radio base station; and a priority control processing unit configured to perform a priority control process for a multiplexing process to the radio bearer for the predetermined QoS of downlink user data, which has been received via each of the bearers for the predetermined QoS, based on a priority assigned to each of the bearers for the predetermined QoS.

A gist of a fourth characteristic of the present invention is a gateway device for a relay node, comprising a priority control processing unit configured to perform a priority control process for a transmission process of downlink user data, which has been received via each of bearers for a predetermined QoS, based on a priority assigned to each of the bearers for the predetermined QoS, when from among a plurality of bearers set between a radio base station and the gateway device, each of bearers for the predetermined QoS set for different mobile stations is configured to be mapped to a radio bearer for the predetermined QoS set between the relay node and the radio base station.

As described above, according to the present invention, it is possible to provide a mobile communication system in which an E-RAB, a Uu radio bearer, a Un radio bearer, and an S1 bearer can be appropriately mapped, a relay node, a radio base station, and a gateway device.

DETAILED DESCRIPTION

Mobile Communication System According to First Embodiment of the Present Invention With reference to FIG. 1 through FIG. 10, a mobile communication system according to a first embodiment of the present invention will be explained.

Figure 1:
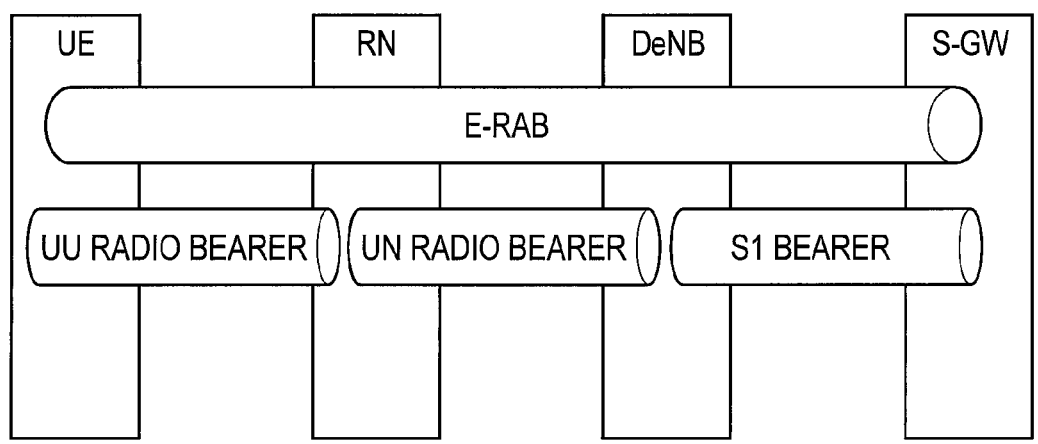
FIG. 1 is a diagram showing the entire configuration of the mobile communication system according to a first embodiment of the present invention.

As illustrated in FIG. 1, the mobile communication system according to the first embodiment of the present invention is an LTE-Advanced mobile communication system, and is configured such that an E-RAB is configured to be set between a mobile station UE and a mobile switching center MME as a bearer for a U plane, a Uu radio bearer is configured to be set in a first radio interval between the mobile station UE and a relay node RN, a Un radio bearer is configured to be set in a second radio interval between the relay node RN and a radio base station DeNB, and an S1 bearer is configured to be set between the radio base station DeNB and a gateway device S-GW.

Figure 2:
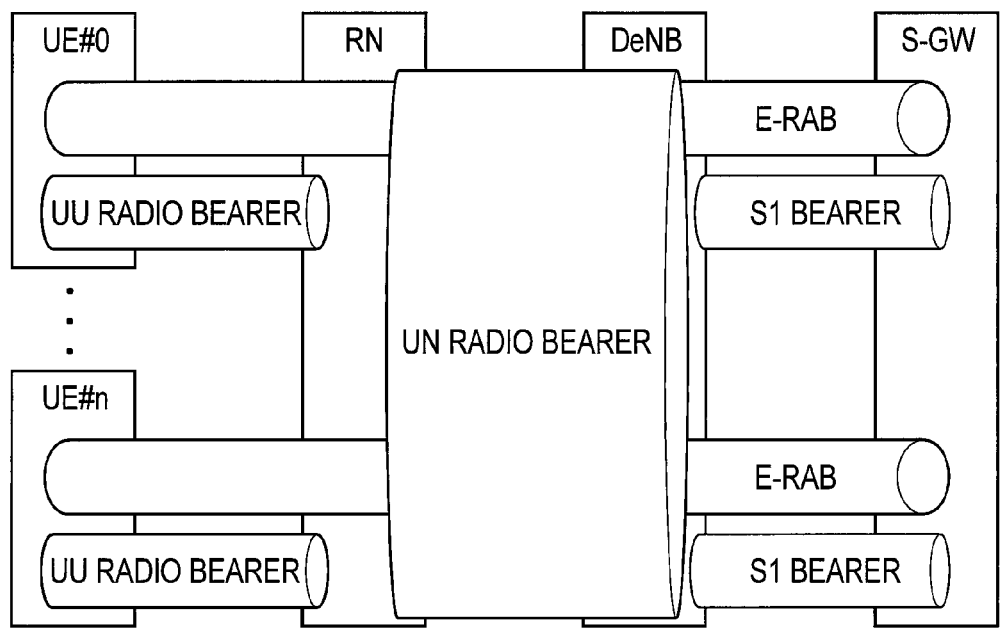
FIG. 2 is a diagram explaining a Uu radio bearer and a Un radio bearer having been set in the mobile communication system according to the first embodiment of the present invention.

Specifically, the mobile communication system according to the present embodiment is configured such that the E-RAB, the Uu radio bearer, the Un radio bearer, and the S1 bearer are mapped to one another as illustrated in FIG. 2.

Figure 3:
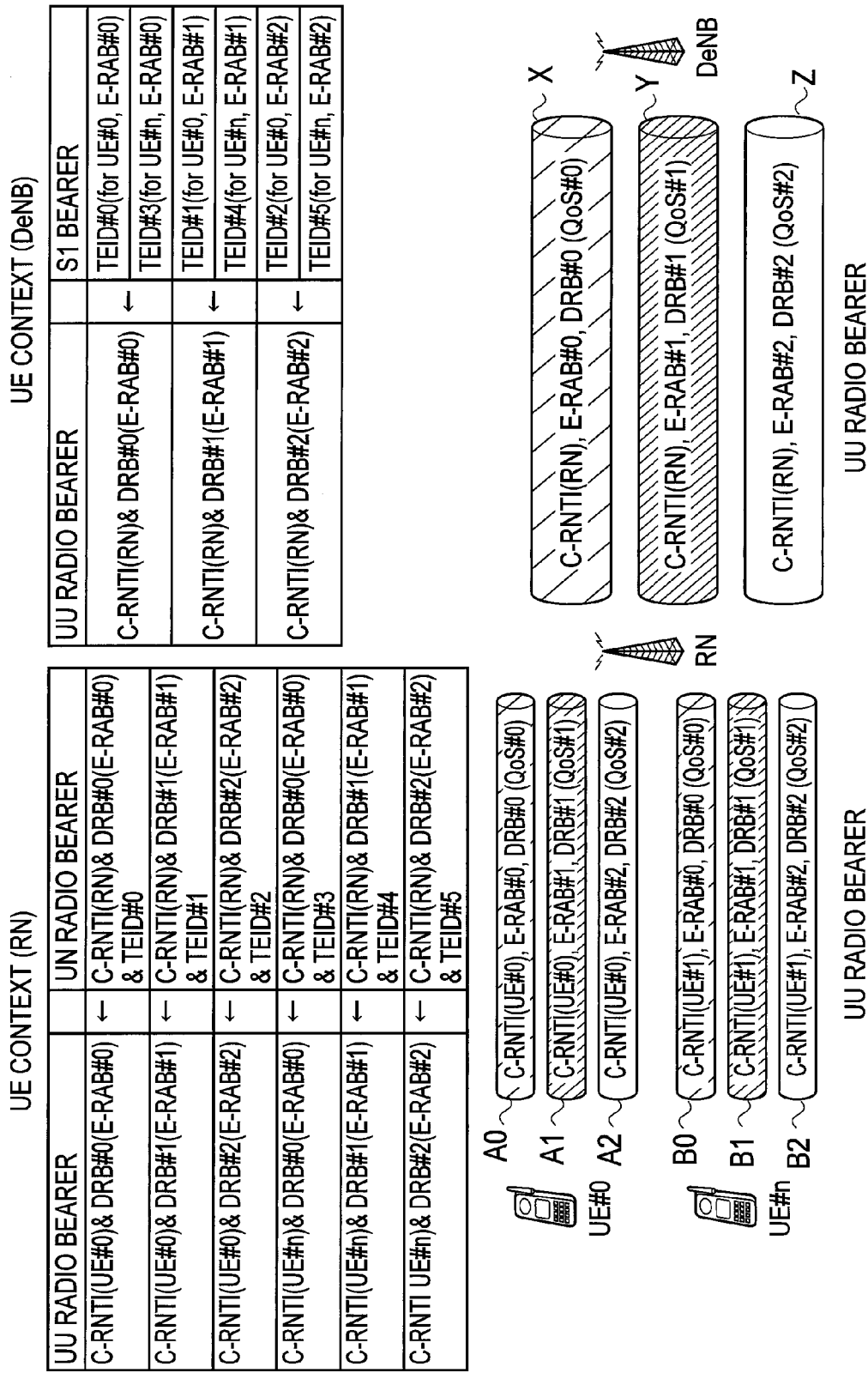
FIG. 3 is a diagram explaining a Uu radio bearer and a Un radio bearer having been set in the mobile communication system according to the first embodiment of the present invention.

Specifically, as illustrated in FIG. 3, the mobile communication system according to the present embodiment is configured such that a mapping processing unit of the relay node RN is configured to map each of Uu radio bearers for a predetermined QoS, which are set for different mobile stations UEs from among a plurality of Uu radio bearers set between a plurality of mobile stations UE#0 to UE#n and the relay node RN, to Un radio bearers X to Z for a predetermined QoS set between the relay node RN and the radio base station DeNB.

For example, as illustrated in FIG. 3, a Uu radio bearer A0 for QoS#0 set for the mobile station UE#0 and a Uu radio bearer B0 for the QoS#0 set for the mobile station UE#n are configured to be mapped to the Un radio bearer X for the QoS#0.

Here, the Uu radio bearer A0 for the QoS#0 set for the mobile station UE#0 is configured to be specified by identification information (CRNTI (UE#0)) of the mobile station UE#0, identification information (E-RAB#0) of the E-RAB of the mobile station UE#0 in the first radio interval, and identification information (DRB#0) of the Uu radio bearer. The Uu radio bearer B0 for the QoS#0 set for the mobile station UE#n is configured to be specified by identification information (CRNTI (UE#n)) of the mobile station UE#n, identification information (E-RAB#0) of the E-RAB of the mobile station UE#n in the first radio interval, and the identification information (DRB#0) of the Uu radio bearer.

Furthermore, the Un radio bearer X for the QoS#0 is configured to be specified by identification information (CRNTI (RN)) of the relay node RN, identification information (E-RAB#0) of the E-RAB in the second radio interval, and identification information (DRB#0) of the Un radio bearer.

In the same manner, in the example of FIG. 3, a Uu radio bearer A1 for QoS#1 set for the mobile station UE#0 and a Uu radio bearer B1 for the QoS#1 set for the mobile station UE#n are configured to be mapped to the Un radio bearer Y for the QoS#1.

Here, the Uu radio bearer A1 for the QoS#1 set for the mobile station UE#0 is configured to be specified by the identification information (CRNTI (UE#0)) of the mobile station UE#0, identification information (E-RAB#1) of the E-RAB of the mobile station UE#0 in the first radio interval, and identification information (DRB#1) of the Uu radio bearer. The Uu radio bearer B1 for the QoS#1 set for the mobile station UE#n is configured to be specified by the identification information (CRNTI (UE#n)) of the mobile station UE#n, identification information (E-RAB#1) of the E-RAB of the mobile station UE#n in the first radio interval, and the identification information (DRB#1) of the Uu radio bearer.

Furthermore, the Un radio bearer Y for the QoS#1 is configured to be specified by the identification information (CRNTI (RN)) of the relay node RN, identification information (E-RAB#1) of the E-RAB in the second radio interval, and identification information (DRB#1) of the Un radio bearer.

Moreover, in the example of FIG. 3, a Uu radio bearer A2 for QoS#2 set for the mobile station UE#0 and a Uu radio bearer B2 for the QoS#2 set for the mobile station UE#n are configured to be mapped to the Un radio bearer Z for the QoS#2.

Here, the Uu radio bearer A2 for the QoS#2 set for the mobile station UE#0 is configured to be specified by the identification information (CRNTI (UE#0)) of the mobile station UE#0, identification information (E-RAB#2) of the E-RAB of the mobile station UE#0 in the first radio interval, and identification information (DRB#2) of the Uu radio bearer. The Uu radio bearer B2 for the QoS#2 set for the mobile station UE#n is configured to be specified by the identification information (CRNTI (UE#n)) of the mobile station UE#n, identification information (E-RAB#2) of the E-RAB of the mobile station UE#n in the first radio interval, and the identification information (DRB#2) of the Uu radio bearer.

Furthermore, the Un radio bearer Z for the QoS#2 is configured to be specified by the identification information (CRNTI (RN)) of the relay node RN, identification information (E-RAB#2) of the E-RAB in the second radio interval, and identification information (DRB#2) of the Un radio bearer.

Specifically, the mapping processing unit of the relay node RN is configured to perform the above-mentioned mapping by managing UE context as illustrated in FIG. 3.

Furthermore, as illustrated in FIG. 3, in the mobile communication system according to the present embodiment, a mapping processing unit of the radio base station DeNB may be configured to map each of S1 bearers for a predetermined QoS, which are set for different mobile stations UE#0 and UE#n from among a plurality of S1 bearers set between the radio base station DeNB and the gateway device S-GW, to Un radio bearers X to Z for the predetermined QoS.

For example, as illustrated in FIG. 3, the S1 bearer for QoS#0 set for the mobile station UE#0 and the S1 bearer for the QoS#0 set for the mobile station UE#n are configured to be mapped to the Un radio bearer X.

Here, the S1 bearer for the QoS#0 set for the mobile station UE#0 is configured to be specified by a TEID#0, and the S1 bearer for the QoS#0 set for the mobile station UE#n is configured to be specified by a TEID#3.

In the same manner, the S1 bearer for QoS#1 set for the mobile station UE#0 and the S1 bearer for the QoS#1 set for the mobile station UE#n are configured to be mapped to the Un radio bearer Y.

Here, the S1 bearer for the QoS#1 set for the mobile station UE#0 is configured to be specified by a TEID#1, and the S1 bearer for the QoS#1 set for the mobile station UE#n is configured to be specified by a TEID#4.

Moreover, the S1 bearer for QoS#2 set for the mobile station UE#0 and the S1 bearer for the QoS#2 set for the mobile station UE#n are configured to be mapped to the Un radio bearer Z.

Here, the **S1 bearer for the QoS#2 set for the mobile station UE#0 is configured to be specified by a TEID#2, and the S1 bearer for the QoS#2 set for the mobile station UE#n is configured to be specified by a TEID#5.

Specifically, the mapping processing unit of the radio base station DeNB is configured to perform the above-mentioned mapping by managing the UE context as illustrated in FIG. 3.

Figure 4:
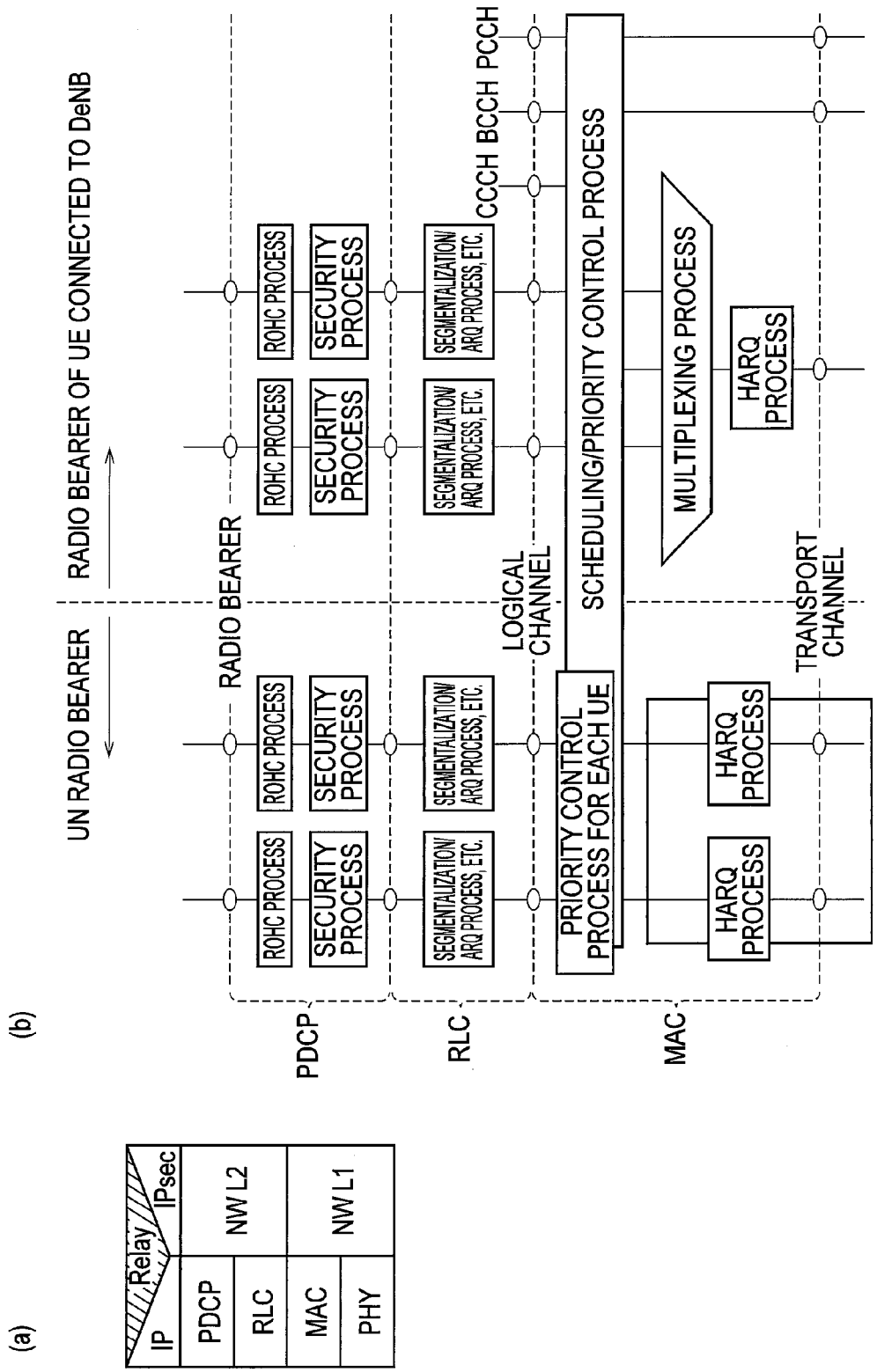
FIG. 4 is a diagram explaining a priority control process for each UE performed in the mobile communication system according to the first embodiment of the present invention.

Furthermore, as illustrated in FIG. 4, the radio base station DeNB has an MAC (Media Access Control) layer function, an RLC (Radio Link Control) layer function, which is an upper layer function of the MAC layer function, and a PDCP (Packet Data Convergence Protocol) layer function which is an upper layer function of the RLC layer function.

The PDCP layer function is configured to perform an ROHC (Robust Header Compression) process and a security process with respect to downlink user data to be transmitted to the Un radio bearer.

Furthermore, the PDCP layer function is configured to perform the ROHC (Robust Header Compression) process and the security process with respect to downlink user data to be transmitted to a radio bearer of a mobile station connected to the radio base station DeNB.

The RLC layer function is configured to perform a segmentalization process, an ARQ (Automatic Repeat Request) process and the like with respect to the downlink user data to be transmitted to the Un radio bearer.

Furthermore, the RLC layer function is configured to perform the segmentalization process, the ARQ process and the like with respect to downlink user data to be transmitted to the radio bearer for the mobile station connected to the radio base station DeNB.

The MAC layer function is configured to perform a scheduling process, a priority control process, an HARQ (Hybrid-ARQ) process and the like with respect to the downlink user data to be transmitted to the Un radio bearer.

Furthermore, the MAC layer function is configured to perform the scheduling process, the priority control process, a multiplexing process, and the HARQ process with respect to the downlink user data to be transmitted to the radio bearer for the mobile station connected to the radio base station DeNB.

Here, a priority control processing unit provided in the MAC layer function may be configured to perform a priority control process (a priority control process for each UE) for a multiplexing process to the Un radio bearer for the predetermined QoS of downlink user data, which has been received via each of the S1 bearers for the predetermined QoS, based on a priority assigned to each of the S1 bearers for the predetermined QoS.

Figure 5:
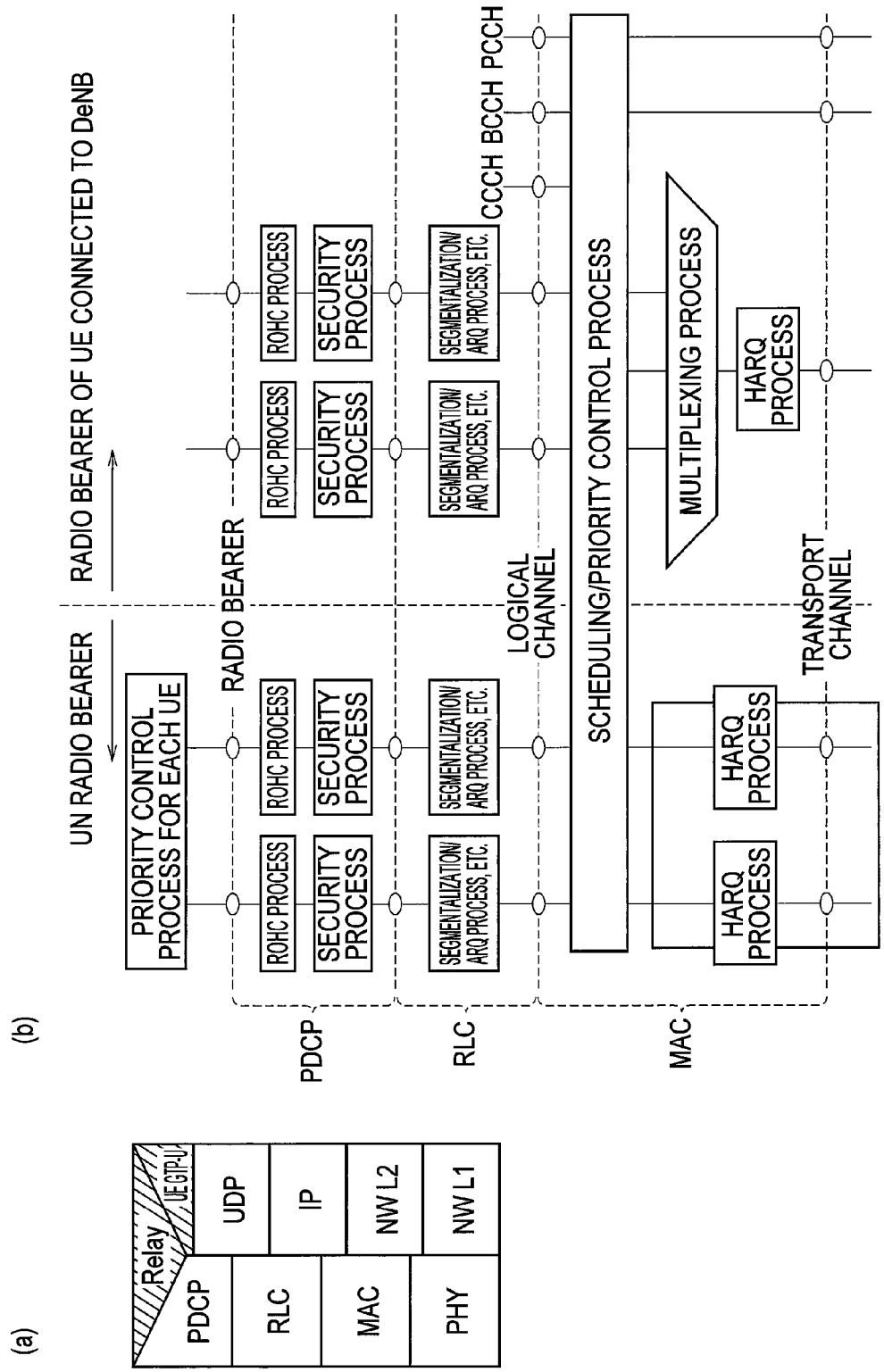
FIG. 5 is a diagram explaining the priority control process for each UE performed in the mobile communication system according to the first embodiment of the present invention.

In addition, as illustrated in FIG. 5, the priority control process (the priority control process for each UE) may also be configured to be performed by a priority control processing unit provided in the upper layer function of the PDCP layer function of the radio base station DeNB.

Specifically, the priority control processing unit is configured to set "ARP (Allocation and Retention Priority) priority" to each S1 bearer based on contract information and the like of each mobile station UE, and preferentially multiplex downlink user data, which has been received via an S1 bearer with high "ARP priority", with respect to the same Un radio bearer.

Figure 6:
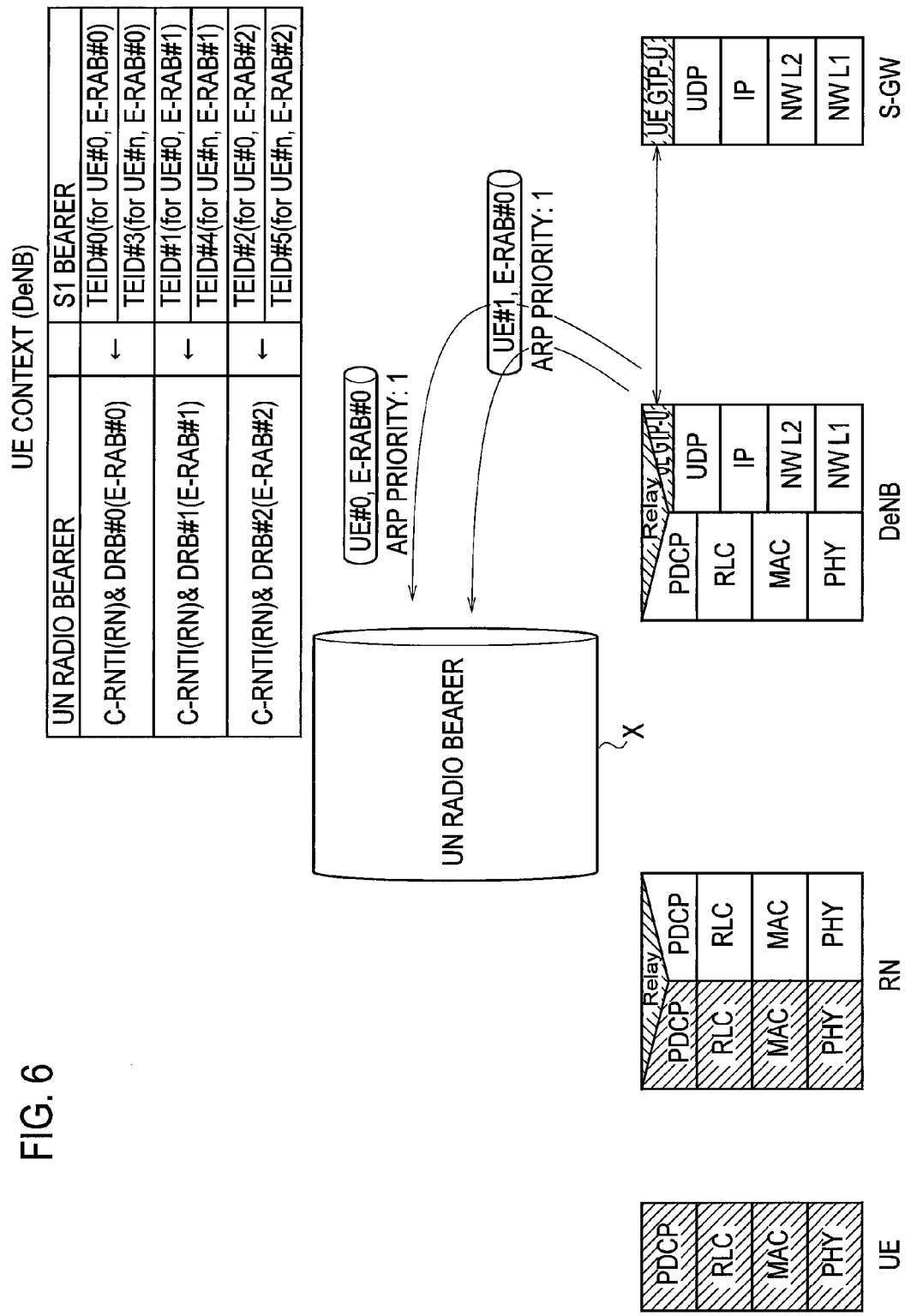
FIG. 6 is a diagram explaining the priority control process for each UE performed in the mobile communication system according to the first embodiment of the present invention.

In the example of FIG. 6, the priority control processing unit is configured to multiplex downlink user data for the mobile station UE#0, which has been received via the S1 bearer (the TEID#0) with "ARP priority: 1", to the Un radio bearer X, preferentially than downlink user data for the mobile station UE#n, which has been received via the S1 bearer (the TEID#3) with "ARP priority: 10".

Figure 7:
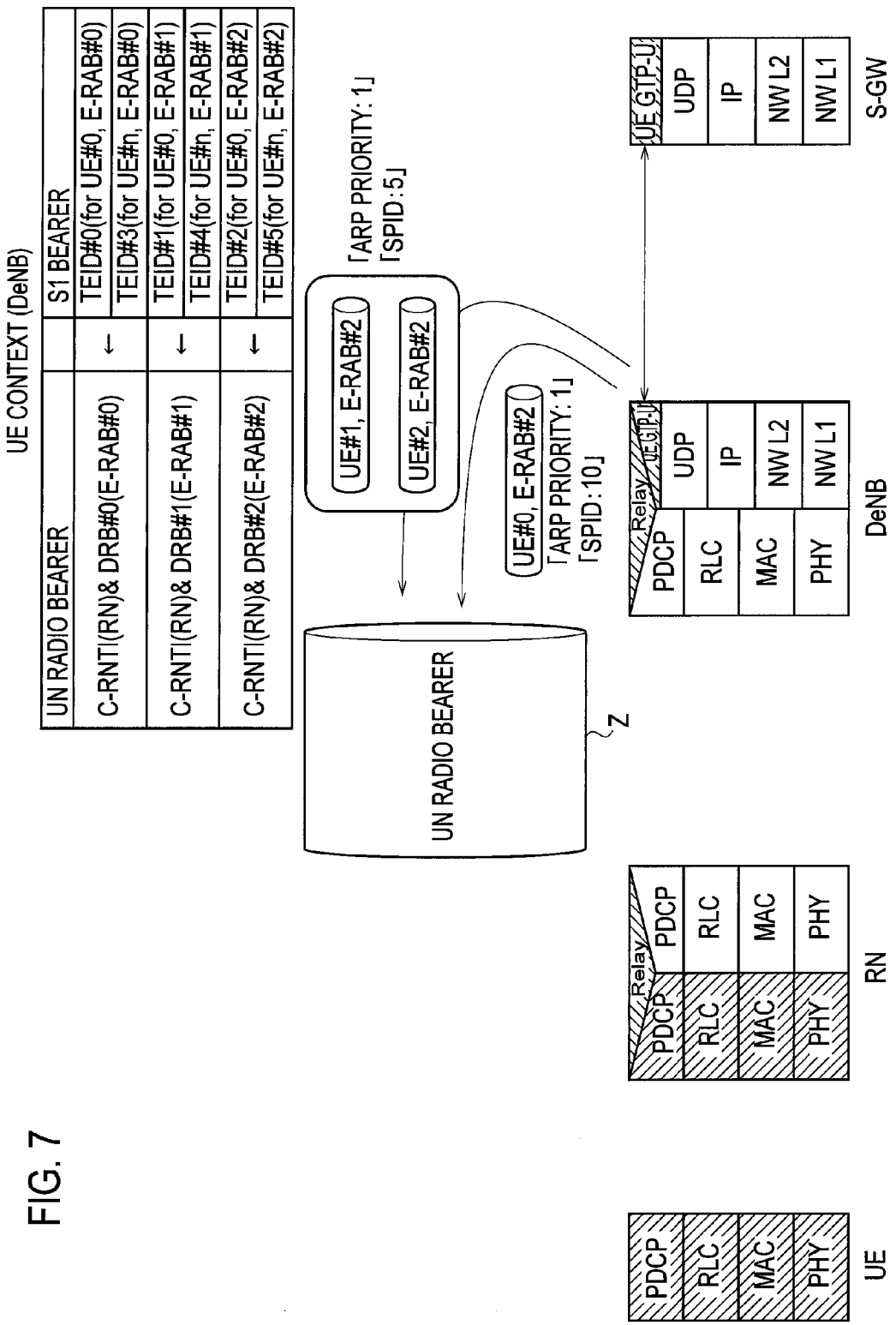
FIG. 7 is a diagram explaining the priority control process for each UE performed in the mobile communication system according to the first embodiment of the present invention.

Here, as illustrated in FIG. 7, an IP address of the same network Prefix may be configured to be assigned to the mobile stations UE#1 and UE#2 belonging to the same group.

Also, an SPID (Subscriber Profile ID for RAT/Frequency Priority) with the same predetermined number of upper bits or lower bits may also be configured to be assigned to the mobile stations UE#1 and UE#2 belonging to the same group.

Otherwise, predetermined numbers of upper bits or lower bits of TEIDs, which may specify S1 bearers set for the mobile stations UE#1 and UE#2 belonging to the same group, may also be configured to be equal to each other.

In the example of FIG. 7, since the same "ARP priority: 1" has been set to the mobile stations UE#1 and UE#2 belonging to the same group and the mobile station UE#0 belonging to no group, the priority control processing unit is configured to multiplex downlink user data, which is addressed to the mobile stations UE#1 and UE#2 with "SPID: 5", to the Un radio bearer Z, preferentially than downlink user data addressed to the mobile station UE#2 with "SPID: 10".

Figure 8:
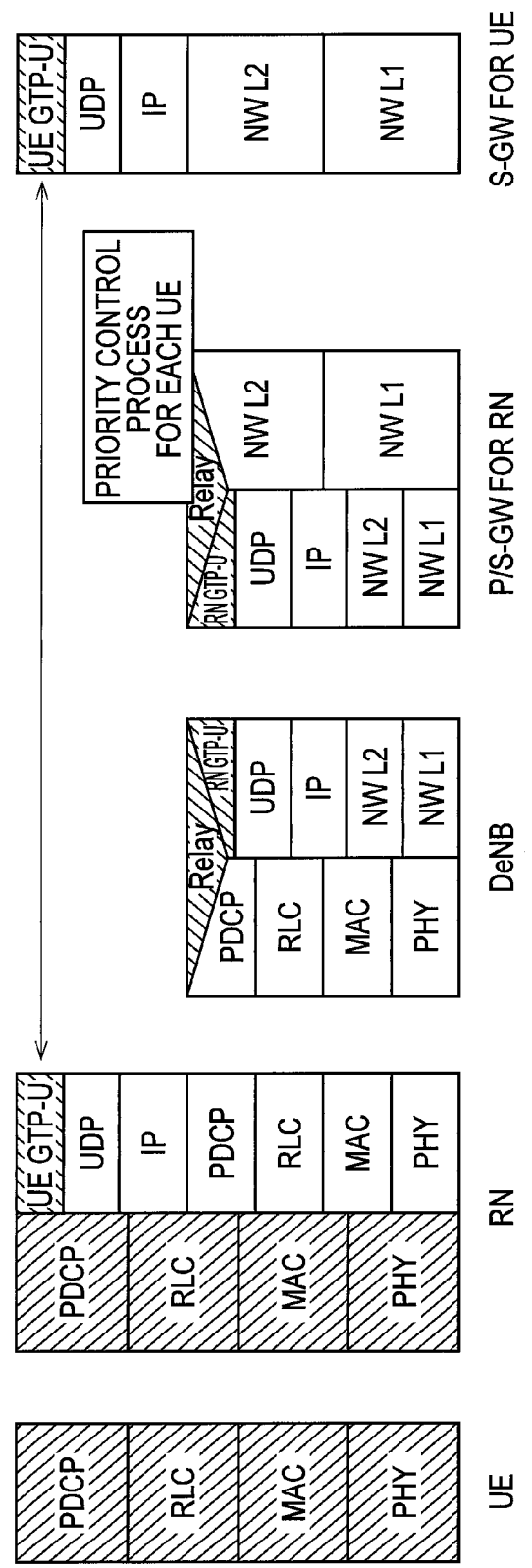
FIG. 8 is a diagram explaining the priority control process for each UE performed in the mobile communication system according to the first embodiment of the present invention.

In addition, as illustrated in FIG. 8, in the mobile communication system according to the present embodiment, the gateway device S-GW includes a gateway device (S-GW for UE) for each mobile station UE, and a gateway device (P/S-GW for RN) for the relay node RN, and the S1 bearer for the predetermined QoS may be configured to be set between the relay node RN and the P/S-GW for RN.

In such a case, as illustrated in FIG. 8, the above-mentioned priority control process (the priority control process for each UE) may also be configured to be performed by a priority control processing unit provided in the upper layer function of the PDCP layer function of the P/S-GW for RN.

Here, in relation to the same Un radio bearer, the priority control processing unit is configured to allow downlink user data to be preferentially tunneled over an S1 bearer with high "ARP priority", and then transmitted the downlink user data.

Figure 9:
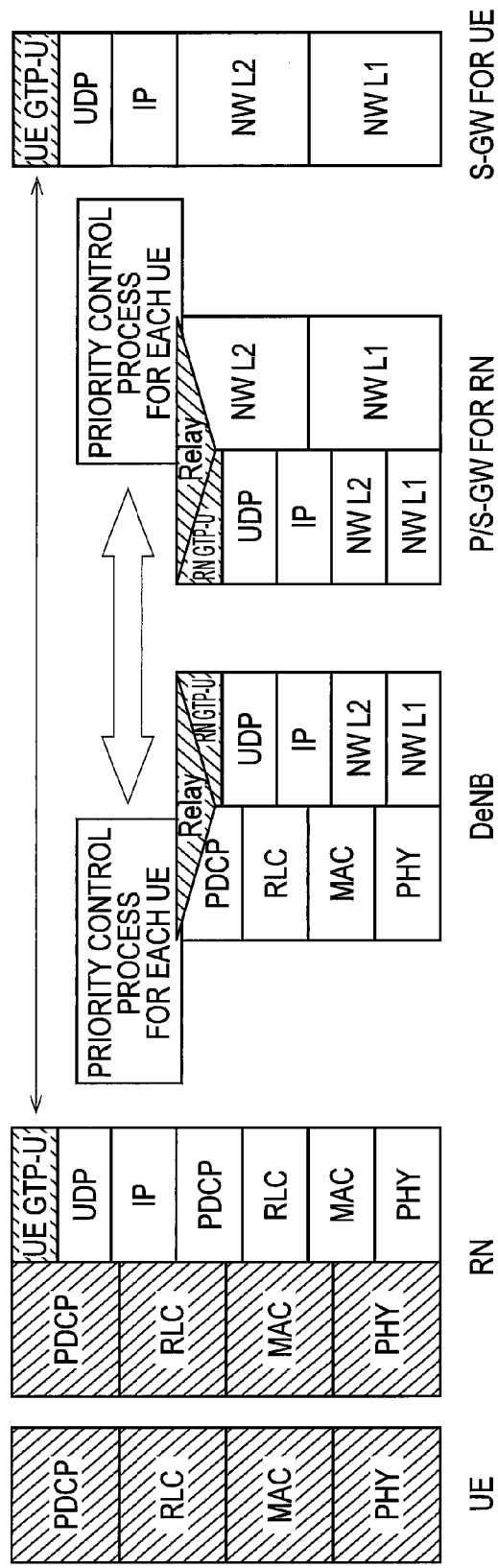
FIG. 9 is a diagram explaining the priority control process for each UE performed in the mobile communication system according to the first embodiment of the present invention.

Furthermore, as illustrated in FIG. 9, in the mobile communication system according to the present embodiment, the above-mentioned priority control process (the priority control process for each UE) may also be configured to be performed by both the priority control processing unit provided in the upper layer function of the PDCP layer function of the P/S-GW for RN, and the priority control processing unit provided in the upper layer function of the PDCP layer function of the radio base station DeNB.

Figure 10:
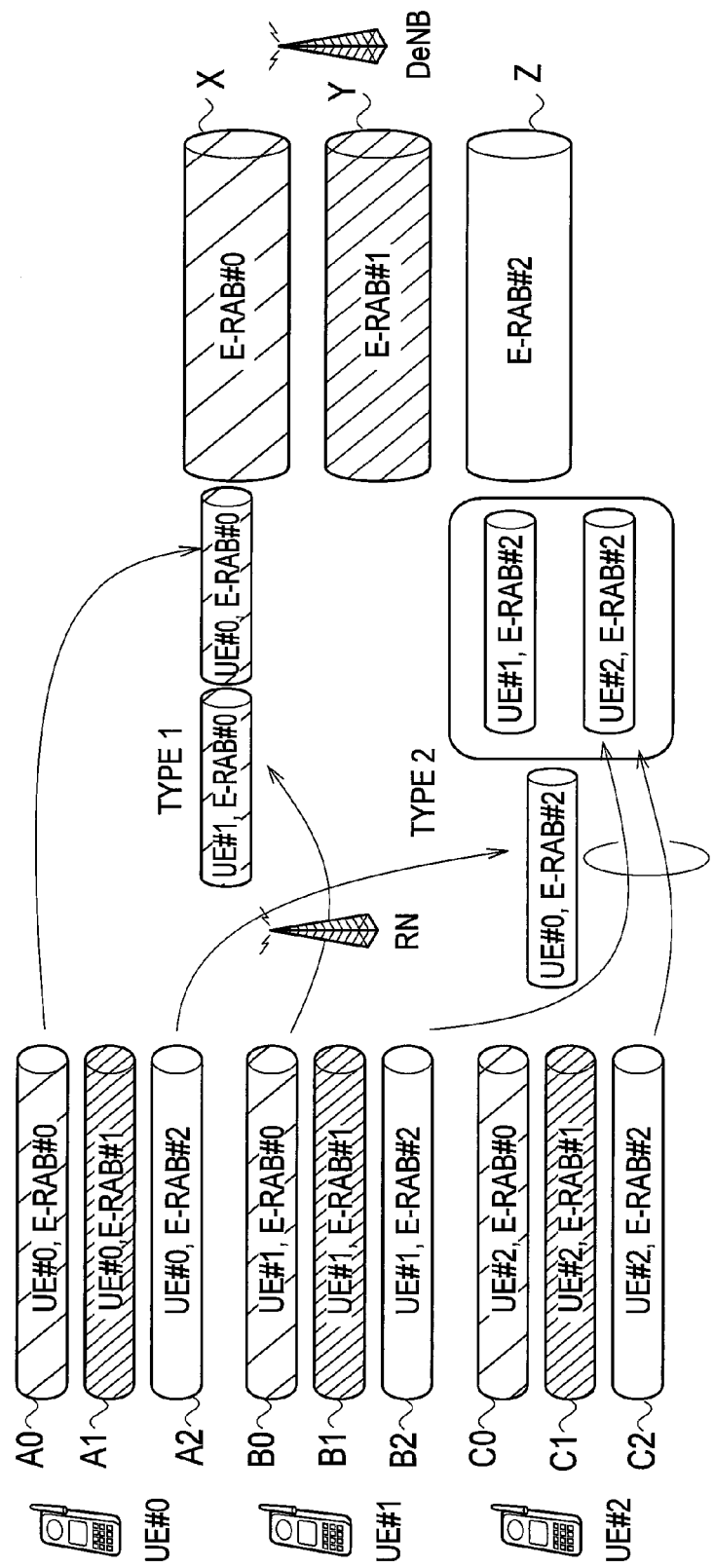
FIG. 10 is a diagram explaining the priority control process for each UE performed in the mobile communication system according to the first embodiment of the present invention.

Furthermore, as illustrated in FIG. 10, the priority control processing unit of the relay node RN is configured to perform a priority control process for a multiplexing process to the Un radio bearer for the predetermined QoS of uplink user data, which has been received via each of the Uu radio bearers for the predetermined QoS, based on a priority assigned to each of the Uu radio bearers for the predetermined QoS.

As illustrated in the type 1 of FIG. 10, the priority control processing unit may also be configured to multiplex uplink user data for the mobile station UE#0, which has been received via a Uu radio bearer #A0 (C-RNTI(UE#0), DRB#0, E-RAB#0), to the Un radio bearer X, preferentially than uplink user data for the mobile station UE#n, which has been received via a Uu radio bearer #B0 (C-RNTI(UE#n), DRB#0, E-RAB#0).

Otherwise, as illustrated in the type 2 of FIG. 10, the priority control processing unit may also be configured to multiplex uplink user data for the mobile station UE#1, which has been received via a Uu radio bearer #B2 (C-RNTI(UE#1), DRB#2, E-RAB#2), and uplink user data for the mobile station UE#2, which has been received via a Uu radio bearer #C2 (C-RNTI(UE#2), DRB#2, E-RAB#2), to the Un radio bearer Z, preferentially than uplink user data for the mobile station UE#0, which has been received via a Uu radio bearer #A2 (C-RNTI(UE#0), DRB#2, E-RAB#2).

Here, it is assumed that the mobile station UE#1 and the mobile station UE#2 belong to the same group. That is, in the type 2 of FIG. 10, the priority control processing unit is configured to perform the above-mentioned priority control process in units of groups to which each mobile station UE belongs.

In accordance with the mobile communication system according to the present embodiment, since the relay node RN is configured to multiplex uplink user data for each mobile station UE, which has been received via Uu radio bearers with the same QoS, to the same Un radio bearer, it is possible to efficiently use a radio resource for the Un radio bearer.

In the same manner, in accordance with the mobile communication system according to the present embodiment, since the radio base station DeNB is configured to multiplex downlink user data for each mobile station UE, which has been received via S1 bearers with the same QoS, to the same Un radio bearer, it is possible to efficiently use a radio resource for the Un radio bearer.

Furthermore, in the mobile communication system according to the present embodiment, when the P/S-GW for RN performs the priority control process, there is no influence to a radio interface in the radio base station DeNB.

Furthermore, in the mobile communication system according to the present embodiment, when the P/S-GW for RN and the radio base station DeNB perform the priority control process, it is possible to perform QoS control in both the S1 bearer and the Un radio bearer.

The characteristics of the present embodiment as described above may be expressed as follows:

A first characteristic of the present embodiment is a mobile communication system including a plurality of mobile stations UE#0 to UE#n, a relay node RN, and a radio base station DeNB, wherein the configuration is such that from among a plurality of Uu radio bearers (first radio bearers) set between the plurality of mobile stations UE#0 to UE#n and the relay node RN, each of Uu radio bearers for the predetermined QoS set for different mobile stations UEs is mapped to a Un radio bearer (second radio bearer) for the predetermined QoS set between the relay node RN and the radio base station DeNB.

In the first characteristic of the present embodiment, the relay node RN may include a priority control processing unit configured to perform a priority control process for a multiplexing process to the Un radio bearers for the predetermined QoS of uplink user data, which has been received via each of the Uu radio bearers for the predetermined QoS, based on a priority assigned to each of the Uu radio bearers for the predetermined QoS.

In the first characteristic of the present embodiment, the configuration may be such that from among a plurality of S1 bearers (bearers) set between the radio base station DeNB and a gateway device S-GW, each of S1 bearers for the predetermined QoS set for different mobile stations UEs is mapped to the Un radio bearer for the predetermined QoS.

In the first characteristic of the present embodiment, the radio base station DeNB may include a priority control processing unit configured to perform a priority control process for a multiplexing process to the Un radio bearers for the predetermined QoS of downlink user data, which has been received via each of the S1 bearers for the predetermined QoS, based on a priority assigned to each of the S1 bearers for the predetermined QoS.

In the first characteristic of the present embodiment, the gateway device S-GW includes a gateway device (S-GW for UE) for each mobile station UE and a gateway device (P/S-GW for RN) for the relay node RN, the S1 bearer for the predetermined QoS is configured to be set between the relay node RN and the P/S-GW for RN, and the P/S-GW for RN may include a priority control processing unit configured to perform a priority control process for a transmission process of downlink user data, which has been received via each of the S1 bearers for the predetermined QoS, based on the priority assigned to each of the S1 bearers for the predetermined QoS.

A second characteristic of the present embodiment is that a relay node RN includes a mapping processing unit configured to map each of Uu radio bearers for a predetermined QoS, which are set for different mobile stations UEs from among a plurality of Uu radio bearers set between a plurality of mobile stations UE#0 to UE#n and the relay node RN, to Un radio bearers for the predetermined QoS set between the relay node RN and the radio base station DeNB, and a priority control processing unit configured to perform a priority control process for a multiplexing process to the Un radio bearers for the predetermined QoS of uplink user data, which has been received via each of the Uu radio bearers for the predetermined QoS, based on a priority assigned to each of the Uu radio bearers for the predetermined QoS.

A third characteristic of the present embodiment is that a radio base station DeNB includes a mapping processing unit configured to map each of S1 bearers for a predetermined QoS, which are set for different mobile stations UEs from among a plurality of S1 bearers set between the radio base station DeNB and a gateway device S-GW, to Un radio bearers for the predetermined QoS set between the relay node RN and the radio base station DeNB, and a priority control processing unit configured to perform a priority control process for a multiplexing process to the Un radio bearers for the predetermined QoS of downlink user data, which has been received via each of the S1 bearers for the predetermined QoS, based on a priority assigned to each of the S1 bearers for the predetermined QoS.

A fourth characteristic of the present embodiment is that a gateway device (P/S-GW for RN) for a relay node RN includes a priority control processing unit configured, when it is configured to map each of S1 bearers for a predetermined QoS, which are set for different mobile stations UEs from among a plurality of S1 bearers set between the radio base station DeNB and the P/S-GW for RN, to a Un radio bearer for the predetermined QoS set between the relay node RN and the radio base station DeNB, to perform a priority control process for a transmission process of downlink user data, which has been received via each of the S1 bearers for the predetermined QoS, based on a priority assigned to each of the S1 bearers for the predetermined QoS.

It is noted that the operation of the above-described the mobile station UE, the relay node RN, the radio base station DeNB or the mobile switching center MME may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the mobile station UE, the relay node RN, the radio base station DeNB or the mobile switching center MME. Further, such a storage medium or a processor may be arranged, as a discrete component, in the mobile station UE, the relay node RN, the radio base station DeNB or the mobile switching center MME.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication system comprising a plurality of mobile stations, a relay node, and a radio base station, wherein
 from among a plurality of first radio bearers set between the plurality of mobile stations and the relay node, by managing user equipment (UE) context, each of first radio bearers for a predetermined QoS set for different mobile stations is configured to be mapped, by a mapping processing unit of the relay node, to a second radio bearer for the predetermined QoS set between the relay node and the radio base station, and
 the relay node comprises a priority control processing unit configured to perform a priority control process for a multiplexing process to the second radio bearer for the predetermined QoS of uplink user data, which has been received via each of the first radio bearers for the predetermined QoS, based on a priority assigned to each of the first radio bearers for the predetermined QoS, wherein,
 from among a plurality of bearers set between the radio base station and a gateway device, each of bearers for a predetermined QoS set for different mobile stations is configured to be mapped to the second radio bearer for the redetermined QoS, and
 the gateway device comprises a priority control processing unit configured to perform a priority control process for a transmission process of downlink user data, which has been received via each of the bearers for the predetermined QoS, based on a priority assigned to each of the bearers for the predetermined QoS.

2. The mobile communication system according to claim 1, wherein the radio base station comprises a priority control processing unit configured to perform a priority control process for a multiplexing process to the second radio bearer for the predetermined QoS of downlink user data, which has been received via each of the bearers for the predetermined QoS, based on a priority assigned to each of the bearers for the predetermined QoS.

3. The mobile communication system according to claim 1, wherein the gateway device comprises:
 a gateway device for each mobile station; and
 a gateway device for the relay node, wherein
   the bearer for the predetermined QoS is configured to be set between the relay node and the gateway device for the relay node.

4. A relay node, comprising:
 a mapping processing unit configured to map, by managing user equipment (UE) context, each of first radio bearers for a predetermined QoS, which are set for different mobile stations from among a plurality of first radio bearers set between a plurality of mobile stations and the relay node, to a second radio bearer for the predetermined QoS set between the relay node and a radio base station; and
 a priority control processing unit configured to perform a priority control process for a multiplexing process to the second radio bearer for the predetermined QoS of uplink user data, which has been received via each of the first radio bearers for the predetermined QoS, based on a priority assigned to each of the first radio bearers for the predetermined QoS, wherein,
 from among a plurality of bearers set between the radio base station and a gateway device, each of bearers for a predetermined QoS set for different mobile stations is configured to be mapped to the second radio bearer for the predetermined QoS, and
 the gateway device comprises a priority control processing unit configured to perform a priority control process for a transmission process of downlink user data, which has been received via each of the bearers for the predetermined QoS, based on a priority assigned to each of the bearers for the redetermined QoS.

5. A radio base station, comprising:
 a mapping processing unit configured to map, by managing user equipment (UE) context, each of bearers for a predetermined QoS, which are set for different mobile stations from among a plurality of bearers set between the radio base station and a gateway device, to a radio bearer for the predetermined QoS set between a relay node and the radio base station; and
 a priority control processing unit configured to perform a priority control process for a multiplexing process to the radio bearer for the predetermined QoS of downlink user data, which has been received via each of the bearers for the predetermined QoS, based on a priority assigned to each of the bearers for the predetermined QoS, wherein,
 from among a plurality of bearers set between the radio base station and the gateway device, each of bearers for a predetermined QoS set for different mobile stations is configured to be mapped to a second radio bearer for the predetermined QoS, and
 the gateway device comprises a priority control processing unit configured to perform a priority control process for a transmission process of downlink user data, which has been received via each of the bearers for the predetermined QoS, based on a priority assigned to each of the bearers for the predetermined QoS.

6. A gateway device for a relay node, comprising:
 a priority control processing unit configured to perform a priority control process for a transmission process of downlink user data, which has been received via each of bearers for a predetermined QoS, based on a priority assigned to each of the bearers for the predetermined QoS, when from among a plurality of bearers set between a radio base station and the gateway device, each of bearers for the predetermined QoS set for different mobile stations is configured to be mapped to a radio bearer for the predetermined QoS set between the relay node and the radio base station, wherein the relay node comprises a mapping processing unit configured to perform the mapping by managing user equipment (UE) context, each of first radio bearers for a predetermined QoS, which are set for different mobile stations from among a plurality of first radio bearers set between a plurality of mobile stations and the relay node, to a second radio bearer for the predetermined QoS set between the relay node and the radio base station; and
 the gateway device for the relay node, wherein the bearer for the predetermined QoS is configured to be set between the relay node and the gateway device for the relay node comprises a priority control processing unit configured to perform a priority control process for a multiplexing process to the second radio bearer for the predetermined QoS of uplink user data, which has been received via each of the first radio bearers for the predetermined QoS, based on a priority assigned to each of the first radio bearers for the predetermined QoS, wherein, from among a plurality of bearers set between the radio base station and the gateway device, each of bearers for the predetermined QoS set for different mobile stations is configured to be mapped to the second radio bearer for the predetermined the QoS, and the gate way device comprises a priority control processing unit configured to perform a priority control process for a transmission process of downlink user data, which has been received via each of the bearers for the predetermined QoS, based on a priority assigned to each of the bearers for the predetermined QoS.

* * * * *